US011254359B1

(12) United States Patent
Wulf

(10) Patent No.: US 11,254,359 B1
(45) Date of Patent: Feb. 22, 2022

(54) LEG ASSEMBLY FOR CONSTRUCTION MACHINE

(71) Applicant: GOMACO Corporation, Ida Grove, IA (US)

(72) Inventor: Jason D Wulf, Odebolt, IA (US)

(73) Assignee: Gomaco Corporation, Ida Grove, IA (US)

( * ) Notice: Subject to any disclaimer, the term of this patent is extended or adjusted under 35 U.S.C. 154(b) by 0 days.

(21) Appl. No.: 17/336,863

(22) Filed: Jun. 2, 2021

(51) Int. Cl.
*B62D 11/20* (2006.01)
*B62D 55/084* (2006.01)
*E01C 19/48* (2006.01)

(52) U.S. Cl.
CPC ............ *B62D 11/20* (2013.01); *B62D 55/084* (2013.01); *E01C 19/4853* (2013.01)

(58) Field of Classification Search
CPC .... B62D 11/20; B62D 55/084; B62D 55/065; B62D 55/026; B62D 55/0655; B62D 7/026; E01C 19/4853
USPC ...... 180/9.44, 9.52, 9.46, 9.5; 254/421, 418, 254/423
See application file for complete search history.

(56) References Cited

U.S. PATENT DOCUMENTS

| | | | |
|---|---|---|---|
| 3,250,553 A * | 5/1966 | Detwiler ................. | F16H 55/56 403/358 |
| 3,252,349 A | 5/1966 | Widdrington | |
| 3,792,745 A * | 2/1974 | Files ..................... | B62D 11/20 180/9.46 |
| 3,970,405 A | 7/1976 | Swisher, Jr. et al. | |
| 4,029,165 A | 6/1977 | Miller et al. | |
| 4,266,917 A | 5/1981 | Godbersen | |
| 4,345,538 A * | 8/1982 | Warner ................... | B63B 1/286 114/274 |
| 4,558,758 A | 12/1985 | Littman et al. | |
| 4,789,266 A * | 12/1988 | Clarke, Jr. ............ | E01C 19/187 404/104 |
| 5,590,977 A | 1/1997 | Guntert et al. | |
| 6,176,643 B1 | 1/2001 | Guntert, Jr. et al. | |
| 6,481,924 B1 | 11/2002 | Smolders et al. | |
| 6,692,185 B2 | 2/2004 | Colvard | |
| 6,890,123 B2 | 5/2005 | Piccoli | |
| 7,523,995 B2 | 4/2009 | Rio et al. | |
| 8,430,045 B2 * | 4/2013 | Hewitt ................ | E02B 17/0809 114/44 |

(Continued)

OTHER PUBLICATIONS

IPR2020-01698, Paper 14, Petitioner's Updated Exhibit List—Filed Feb. 16, 2021, 9 pages.

(Continued)

*Primary Examiner* — Anne Marie M Boehler
(74) *Attorney, Agent, or Firm* — Suiter Swantz pc llo

(57) ABSTRACT

A leg assembly includes a guide tube, a power drive coupled to a flange of the guide tube, a steering ring coupled to the power drive, a tube weldment coupled to the steering ring, and a hydraulic actuator coupled within the guide tube and within the tube weldment. The power drive includes a slew drive or a hydraulic cylinder steering assembly. The tube weldment is translated through the power drive by the actuator. To achieve a minimal width, the tube weldment includes a keyway. The steering ring includes a key by which relative rotational movements may be imparted to the keyway. The steering ring is rotated by the power drive. Thus, the guide tube may be rotated relative to the tube weldment.

25 Claims, 18 Drawing Sheets

(56) References Cited

U.S. PATENT DOCUMENTS

| | | | |
|---|---|---|---|
| 9,388,538 B2 | | 7/2016 | Dahm et al. |
| 9,464,716 B2 * | | 10/2016 | Farr .......................... F16J 1/12 |
| 9,708,020 B2 | | 7/2017 | Guntert et al. |
| 9,764,762 B2 | | 9/2017 | Klein et al. |
| 9,851,005 B2 * | | 12/2017 | Wagner ................... F16J 1/008 |
| 9,908,571 B2 | | 3/2018 | Guntert, Jr. et al. |
| 10,005,489 B2 | | 6/2018 | Farr et al. |
| 10,029,749 B2 | | 7/2018 | Guntert et al. |
| 10,196,101 B2 | | 2/2019 | Guntert et al. |
| 10,221,528 B2 * | | 3/2019 | Dahm .................. B62D 55/065 |
| 10,710,631 B2 * | | 7/2020 | Zhang .................... B62D 11/20 |
| 2003/0173130 A1 | | 9/2003 | Johns |
| 2006/0024134 A1 | | 2/2006 | Rio et al. |
| 2013/0000996 A1 * | | 1/2013 | Miller ................... E01C 23/088 180/9.46 |
| 2016/0061327 A1 * | | 3/2016 | Farr ........................ E01C 19/42 92/171.1 |
| 2017/0282983 A1 * | | 10/2017 | Guntert, Jr. ........... B62D 11/003 |
| 2018/0155883 A1 * | | 6/2018 | Engels .................... E01C 19/42 |
| 2018/0208240 A1 * | | 7/2018 | Farr ....................... E01C 19/004 |
| 2020/0255074 A1 | | 8/2020 | Guntert, Jr. et al. |
| 2020/0355248 A1 * | | 11/2020 | Fisher ................... F16C 29/005 |

OTHER PUBLICATIONS

IPR2021-00050, Paper 14, Petitioner's Updated Exhibit List—Filed Feb. 16, 2021, 9 pages.
IPR2021-00135, Paper 10, Petitioner's Updated Exhibit List—Filed Apr. 2, 2021, 9 pages.
IPR2021-00136, Exhibit 1005, Commander III, New Generation Trimmer Paver Operator Service Manual G21 Controls Part 1 of 2—Filed Nov. 6, 2020, 237 pages.
IPR2021-00136, Exhibit 1020, GOMACO's Invalidity Contentions Cover Sheet—Filed Nov. 6, 2020, 16 pages.
IPR2021-00136, Exhibit 1021, Joint Claim Construction Statement—Filed Nov. 6, 2020, 10 pages.
IPR2021-00136, Exhibit 1027, GT-3200 Trimmer Slipform Paver—Filed Nov. 6, 2020, 8 pages.
IPR2021-00136, Paper 1, Petition for Inter Partes Review—Filed Nov. 6, 2020, 128 pages.
IPR2021-00136, Paper 11, Petitioner's Updated Exhibit List—Filed Apr. 2, 2020, 9 pages.
IPR2021-00136, Paper 14, Redacted Petitioner's Reply to Patent Owner's Preliminary Response—Filed Apr. 2, 2020, 7 pages.
IPR2021-00136a—Exhibit 1005, Commander III, New Generation Trimmer Paver Operator Service Manual G21 Controls Part 2 of 2—Filed Nov. 6, 2020, 215 pages.
IPR2021-00161, Paper 10, Petitioner's Updated Exhibit List—Filed Apr. 2, 2021, 9 pages.
IPR2021-00234, Paper 11, Petitioner's Updated Exhibit List—Filed Apr. 2, 2021, 4 pages.
IPR2021-00235, Paper 9, Petitioner's Updated Exhibit List—Filed Apr. 2, 2021, 4 pages.

* cited by examiner

LEG ASSEMBLY FOR CONSTRUCTION MACHINE

TECHNICAL FIELD

Embodiments of the invention are directed generally toward the field of paving operations, and more particularly for leg assemblies for controlling crawler track rotation and machine height.

BACKGROUND

Construction machines, such as curb-and-gutter machines or slipform pavers, may be supported by one or more leg assemblies. The leg assemblies may bear a substantial portion of a weight of the construction machine. The leg assemblies may be coupled with a propulsion device for propelling the construction machine onsite, such as a drive wheel or a crawler assembly. The leg assemblies may additionally include a power drive for rotating an orientation of the crawler assembly. Existing leg assemblies have included either a slew drive or a hydraulic smart steering cylinder. The leg assemblies have required different leg configurations to enable the rotation of the crawler assembly depending upon which power drive is used. Therefore, it would be advantageous to provide a device, system, and method that cures the shortcomings described above.

SUMMARY

A steering ring for rotating a tube weldment relative to a guide tube is described, in accordance with one or more embodiments of the present disclosure. In one embodiment, the steering ring includes a cylindrical collar including a first surface defining an outside diameter and a second surface defining an inside diameter. In another embodiment, the cylindrical collar includes a key-seat inset into the second face. In another embodiment, the steering ring includes a key coupled to the key-seat. In another embodiment, the key includes a first face and a second face opposite the first face. In another embodiment, the first face and the second face extend beyond the key-seat such that the key is configured to translate rotational movements of the cylindrical collar to a keyway. In another embodiment, the steering ring includes a wear pad interfacing between the first face of the key and the keyway. In another embodiment, the steering ring includes a retainer configured to detachably attach to the cylindrical collar. In another embodiment, the retainer is configured to retain the wear pad when the retainer is attached to the cylindrical collar.

A tube weldment is described, in accordance with one or more embodiments of the present disclosure. In one embodiment, the tube weldment includes a cylindrical tube including a first surface defining an outside diameter of the cylindrical tube and a second surface defining an inside diameter of the cylindrical tube. In another embodiment, the cylindrical tube includes a slot inset into the first surface along a first length of the cylindrical tube. In another embodiment, the cylindrical tube is configured to couple with a hydraulic actuator inside of the cylindrical tube. In another embodiment, the tube weldment includes a plate coupled to the slot of the cylindrical tube by a weld. In another embodiment, the plate defines a keyway. In another embodiment, the tube weldment includes a yoke coupled to a bottom portion of the cylindrical tube. In another embodiment, the yoke defines a u-shaped channel by which the yoke is configured to couple with a crawler assembly of a construction machine. In another embodiment, at least a portion of the keyway is configured to translate within a guide tube by the hydraulic actuator.

A leg assembly is described, in accordance with one or more embodiments of the present disclosure. In one embodiment, the leg assembly includes a guide tube including a lower flange. In another embodiment, the leg assembly includes a power drive coupled to the lower flange of the guide tube. In another embodiment, the leg assembly includes a steering ring coupled to the power drive. In another embodiment, the steering ring includes a cylindrical collar, a key, a wear pad, and a retainer. In another embodiment, the cylindrical collar includes a key-seat to which the key is coupled. In another embodiment, the retainer is detachably attached to the cylindrical collar. In another embodiment, the retainer retains the wear pad when the retainer is attached to the cylindrical collar. In another embodiment, the leg assembly includes a tube weldment including a keyway receiving the key. In another embodiment, the power drive is configured to rotate the tube weldment relative to the guide tube by rotating the steering ring which translates such rotation to the tube weldment by the key and the keyway. In another embodiment, the wear pad interfaces between the key and the keyway for reducing a wear on the key and the keyway. In another embodiment, the leg assembly includes a hydraulic actuator including a first end and a second end. In another embodiment, a first end of the hydraulic actuator is coupled to the guide tube. In another embodiment, the second end of the hydraulic actuator is coupled to the tube weldment. In another embodiment, the hydraulic actuator is configured to actuate to linearly translate the tube weldment relative to the guide tube. In another embodiment, the key and the wear pad are configured to travel along the keyway of the tube weldment when the tube weldment linearly translates relative to the guide tube. In another embodiment, the keyway is configured to translate through an inner diameter of the power drive when the tube weldment linearly translates relative to the guide tube. In another embodiment, the power drive includes a slew drive or a hydraulic steering cylinder.

A leg assembly is described, in accordance with one or more embodiments of the present disclosure. In one embodiment, the leg assembly includes a guide tube including an upper flange and a lower flange. In another embodiment, the leg assembly includes a slew drive including an outer ring and an inner ring. In another embodiment, the slew drive is coupled to the lower flange of the guide tube by the outer ring. In another embodiment, the leg assembly includes a steering ring coupled to the inner ring of the slew drive. In another embodiment, the steering ring includes a cylindrical collar including a first surface defining an outside diameter and a second surface defining an inside diameter. In another embodiment, the cylindrical collar includes a key-seat inset into the second surface. In another embodiment, the steering ring includes a rectangular key coupled to the key-seat of the cylindrical collar. In another embodiment, the rectangular key includes a first face and a second face opposite of the first face. In another embodiment, the first face and the second face of the rectangular key extend beyond the key-seat. In another embodiment, the steering ring includes a first wear pad. In another embodiment, the steering ring includes a retainer detachably attached to the cylindrical collar for retaining the first wear pad. In another embodiment, the leg assembly includes a tube weldment. In another embodiment, the tube weldment includes a cylindrical tube including a first surface defining an outside diameter and a second surface defining an inside diameter. In another embodiment, the cylindrical tube includes a slot inset into the first surface along a first length. In another embodiment, the tube weldment includes a plate coupled to the slot of the cylindrical tube by a weld. In another embodiment, the plate defines a rectangular keyway. In another embodiment, the slew drive is configured to rotate the tube weldment relative to the guide tube by rotating the steering ring which translates such rotation to the tube weldment by the key and the keyway. In another embodiment, the first wear pad is configured to interface between the first face of the rectangular key and the rectangular keyway. In another embodiment, the leg assembly includes a hydraulic actuator including a first end and a second end. In another embodiment, the first end of the hydraulic actuator is coupled to the upper flange of the guide tube. In another embodiment, the second end of the hydraulic actuator is coupled to cylindrical tube. In another embodiment, the hydraulic actuator is configured to actuate to linearly translate the cylindrical tube relative to the guide tube. In another embodiment, the rectangular key and the first wear pad are configured to travel along the rectangular keyway when the cylindrical tube linearly translates relative to the guide tube. In another embodiment, the keyway is configured to translate through an inner diameter of the power drive when the tube weldment linearly translates relative to the guide tube.

A paving machine is described, in accordance with one or more embodiments of the present disclosure. In one embodiment, the paving machine includes a frame including a slip-form for moving in a first direction of travel for forming a material into shape. In another embodiment, the paving machine includes a leg assembly supporting at least a portion of the frame. In another embodiment, the leg assembly includes a guide tube including a lower flange. In another embodiment, the leg assembly includes a power drive coupled to the lower flange of the guide tube. In another embodiment, the leg assembly includes a steering ring coupled to the power drive. In another embodiment, the steering ring includes a cylindrical collar, a key, a wear pad, and a retainer. In another embodiment, the cylindrical collar includes a key-seat to which the key is coupled. In another embodiment, the retainer is detachably attached to the cylindrical collar. In another embodiment, the retainer is configured to retain the wear pad when the retainer is attached to the cylindrical collar. In another embodiment, the leg assembly includes a tube weldment including a keyway receiving the key. In another embodiment, the power drive is configured to rotate the tube weldment at least ninety degrees relative to the guide tube by rotating the steering ring which translates such rotation to the tube weldment by the key and the keyway. In another embodiment, the wear pad is configured to interface between the key and the keyway. In another embodiment, the leg assembly includes a hydraulic actuator including a first end and a second end. In another embodiment, the first end of the hydraulic actuator is coupled to the guide tube. In another embodiment, the second end of the hydraulic actuator is coupled to the tube weldment. In another embodiment, the hydraulic actuator is configured to actuate to linearly translate the tube weldment relative to the guide tube. In another embodiment, the key and the wear pad are configured to travel along the keyway of the tube weldment when the tube weldment linearly translates relative to the guide tube. In another embodiment, the keyway is configured to translate through an inner diameter of the power drive when the tube weldment linearly translates relative to the guide tube. In another embodiment, the paving machine includes a crawler assembly coupled to the tube weldment. In another embodiment, the crawler assembly includes a track drive for propelling the frame in the first direction. In another embodiment, the paving machine includes a pivot arm pivotably connecting the leg assembly to the frame. In another embodiment, the paving machine includes a power supply connected to at least the track drive, the hydraulic actuator, and the power drive for supplying power to the track drive and the power drive.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
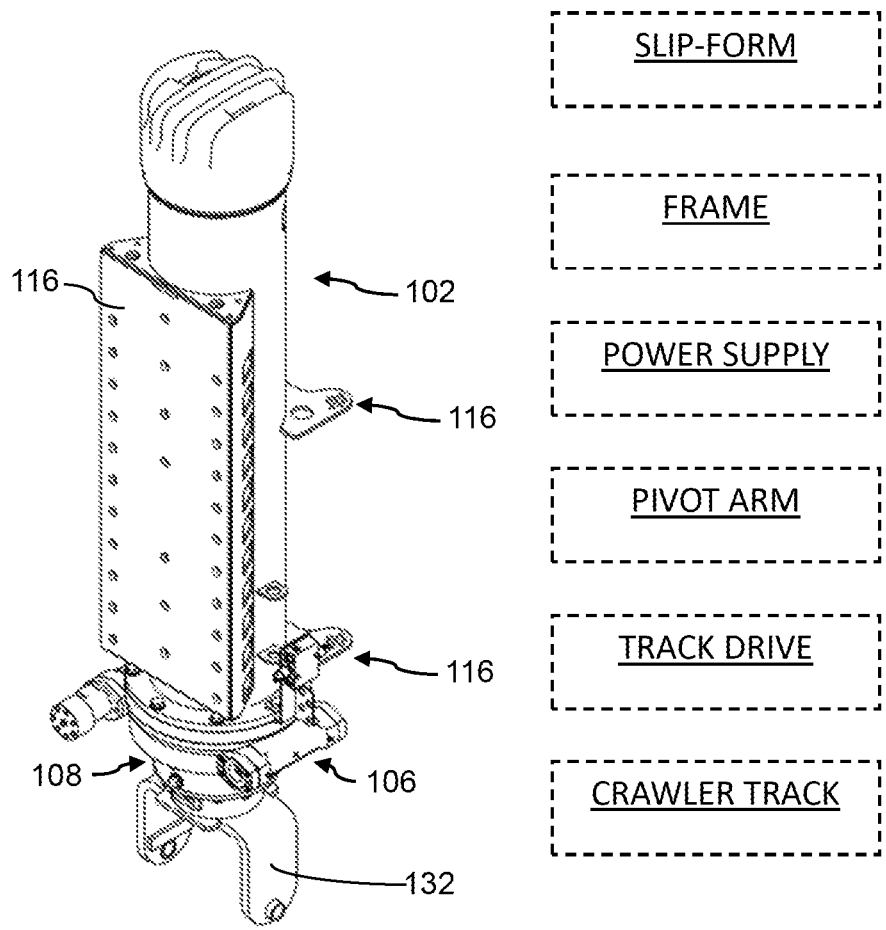
FIG. 1A depicts an isometric view of a leg assembly, in accordance with one or more embodiments of the present disclosure.
Figure 1B:
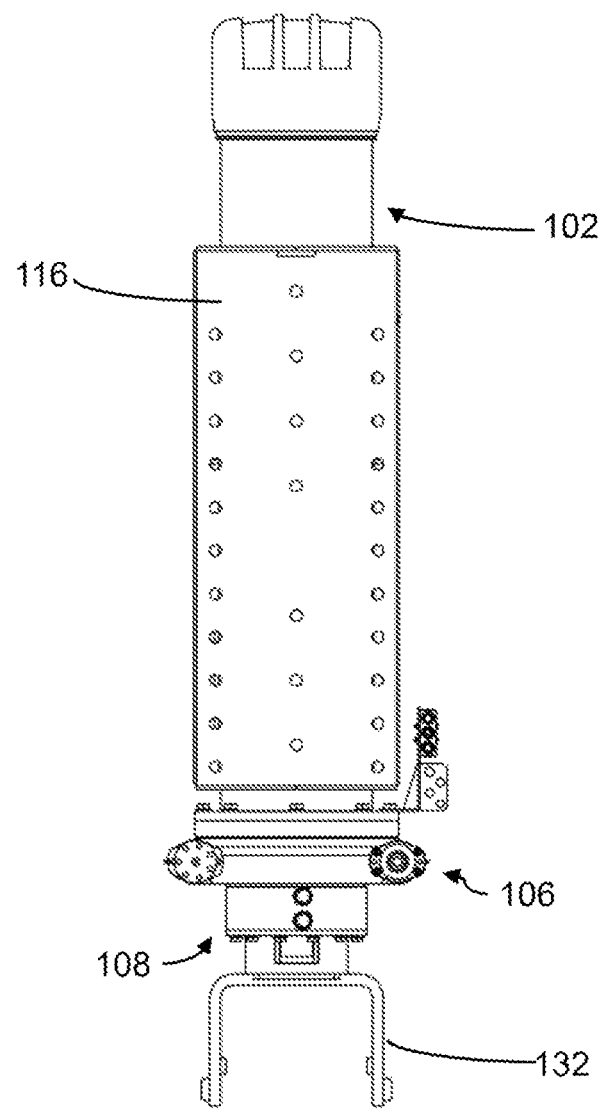
FIG. 1B depicts a rear view of a leg assembly, in accordance with one or more embodiments of the present disclosure.
Figure 1C:
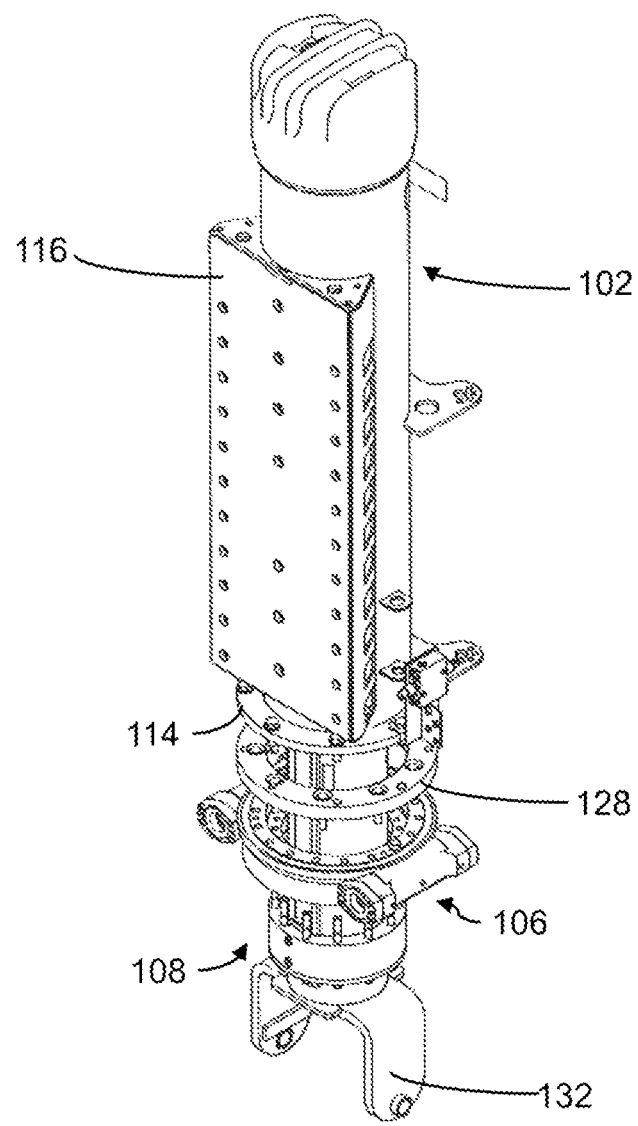
FIG. 1C depicts a partial exploded view of a leg assembly, in accordance with one or more embodiments of the present disclosure.
Figure 1D:
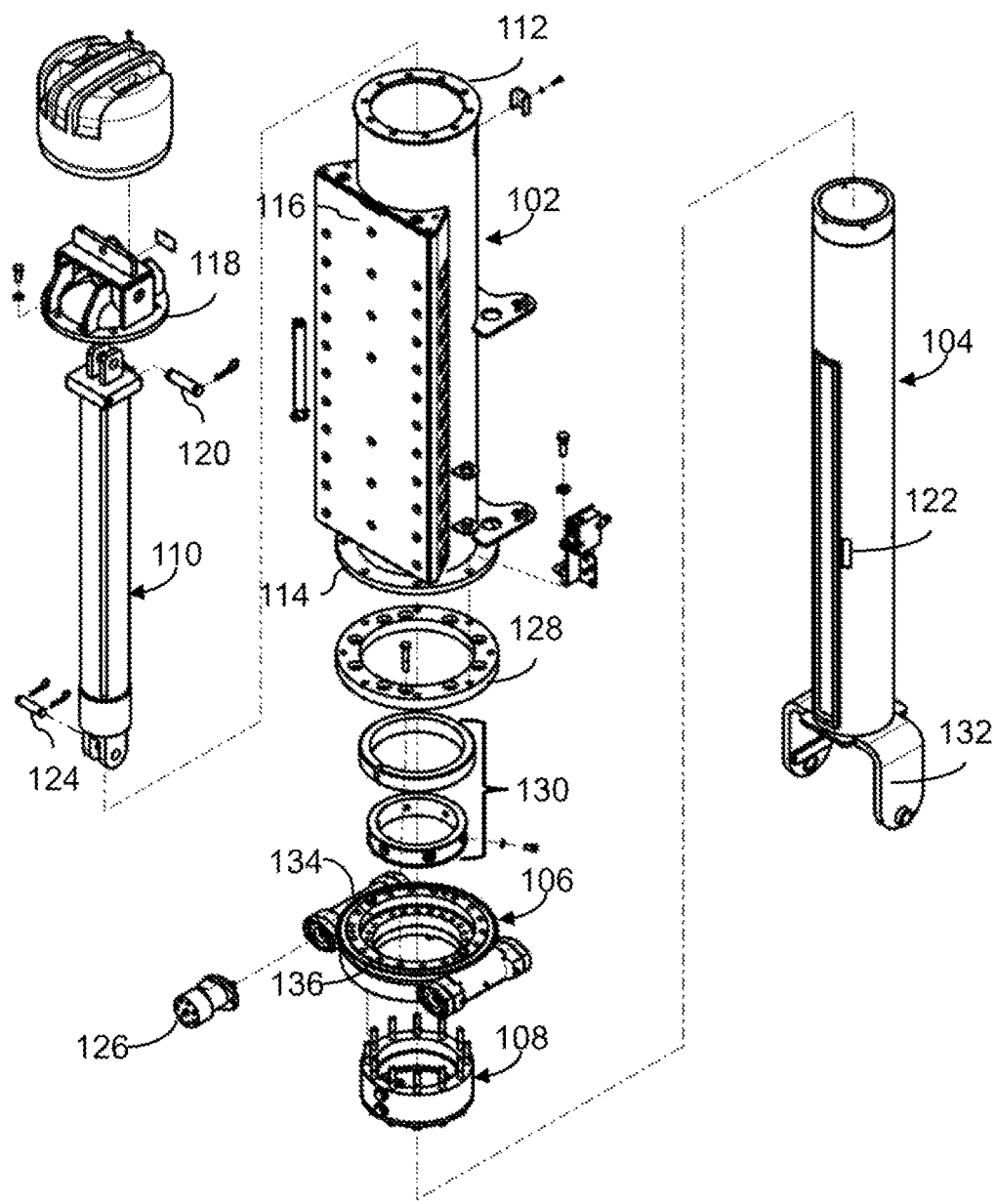
FIG. 1D depicts an exploded view of a leg assembly, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment", "in embodiments", or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Referring generally to FIGS. 1A-6D, a leg assembly for a construction machine is described, in accordance with one or more embodiments of the present disclosure. The leg assembly may include one or more of a guide tube, a power drive coupled to an end of the guide tube, a steering ring coupled to the power drive, a tube weldment, and a hydraulic actuator coupled within the guide tube and within the tube weldment. By the coupling within the guide tube and within the tube weldment, a stroke of the hydraulic actuator may be increased. The tube weldment may include a cylindrical tube and a yoke coupled to the bottom of the cylindrical tube. The cylindrical tube portion of the tube weldment may be translated within the guide tube for a length corresponding to the stroke. Thus, an inner width of the cylindrical tube portion of the tube weldment may be greater than the width of the hydraulic actuator to allow the hydraulic actuator to be coupled within the tube weldment. The cylindrical tube portion of the tube weldment may also be translated through an inner diameter of the power drive. In this regard, the cylindrical tube may include an outer width which is constrained by the power drive and an inner width which is constrained by the hydraulic actuator. The power drive may be configured to rotate the tube weldment relative to the guide tube for steering a crawler assembly of a paver. In some embodiments, the power drive includes a slew drive which is configured to rotate the tube weldment by up to ninety degrees or more relative to the guide tube. Such steering reconfiguration may be advantageous in selectively reconfiguring a pivot arm between a transport and a paving configuration.

In embodiments, the tube weldment may include a keyway along a length of an outer surface of the tube weldment. The length of the keyway may be longer than a stroke of the hydraulic actuator. The keyway may be configured to receive a key. The steering ring may include the key. In this regard, the power drive may provide a rotational motion of the steering ring relative to the guide tube. Such relative rotational motion may similarly cause the key to engage with the keyway of the tube weldment, causing the tube weldment to rotate relative to the guide tube. By the keyway along the length of the tube weldment, the tube weldment may include an appropriate outer width for fitting within the inner diameter of the power drive, include an appropriate inner width for receiving the hydraulic actuator within the tube weldment, and receive sufficient rotational forces for rotating a crawler when supporting a construction machine. In embodiments, the power drive may include a hydraulic steering cylinder or a slew drive which is coupled to the lower flange of the guide tube. The keyway may be advantageous in allowing for a power drive with a reduced inner diameter.

In embodiments, the construction machine is a paving machine. The paving machine, may include any suitable paving machine, such as, but not limited to, a slipform paver. A slipform paver is described in U.S. Pat. No. 10,005,489 titled Ratchet Assembly and Rotational Sensor Drive Mechanism, which is incorporated by reference herein in its entirety. The paving machine may include one or more of frame, leg assemblies, pivot arms, power supply, and processor. The frame may include a slip-form. The slip-form may be moved in a first direction of travel for forming a material into shape. For example, the material may include concrete to be formed into a roadway. The slip-form may be mountable below the frame. In some embodiments, the frame may include an adjustable width, although this is not intended to be limiting. The power supply may be connected to the frame. The power supply may include any power source configured to generate power known in the art, such as, but not limited to, a gasoline engine, a diesel engine, or an electric power supply of various sizes and power ratings. The power supply may be configured to supply the power to one or more components of the paving machine. For example, the power supply may generate hydraulic power or electric power for supplying to one or more components. The pivot arm may pivotably connect the leg assembly to the frame. In this regard, the pivot arm may be pivotably connected to the frame by any suitable mechanism, such as, but not limited to, a slew drive, a ratcheting assembly, a four-bar-linkage configuration of a hydraulic cylinder, or a planetary drive. The crawler assembly may include a continuous track driven by a track drive in a forward or reverse direction. By the continuous track, the paving machine may be driven in a direction.

In some embodiments, the paver machine may include one or more leg assemblies 100. For example, the paving machine may include two, three, or four leg assemblies 100. The leg assemblies 100 may support at least a portion of the frame. In this regard, the leg assemblies 100 may be configured to support from 10,000 pounds to 27,000 pounds, or more. The leg assemblies 100 may be configured to adjust a height of the frame relative to a ground surface. Furthermore, the leg assemblies 100 may be configured to control a steering angle of a crawler assembly.

Referring now to FIGS. 1A-1D, a leg assembly 100 is described in accordance with one or more embodiments of the present disclosure. The leg assembly 100 may include one or more of a guide tube 102, a tube weldment 104, a power drive (e.g., slew drive 106), a steering ring 108, or a hydraulic actuator 110.

The guide tube 102 may include a cylindrical structure with an outer diameter and an inner diameter defined between a first and second end. The leg assembly 100 may be mounted to a construction machine, such that the first end may be considered an upper end and the second end may be considered a lower end. In embodiments, the guide tube 102 may include a flange 112 on the upper end and a flange 114 on the lower end. The flanges 112, 114 may be coupled to the ends of the guide tube 102 in any suitable fashion, such as, but not limited to, a weld. The guide tube 102 may also a mounting flange 116. The mounting flange 116 may be disposed on an outside surface of the guide tube 102. By the mounting flange 116, the leg assembly 100 may mount to one or more components of the construction machine. For example, the mounting flange 116 may be configured to receive a pivoting arm of the construction machine. The mounting flange 116 may be welded to an outer surface of the guide tube 102.

The leg assembly 100 may also include the tube weldment 104. The tube weldment 104 may include a width smaller than the inner diameter of the guide tube 102. In this regard, the tube weldment 104 may fit within the guide tube 102. The leg assembly 100 may also include the hydraulic actuator 110. The hydraulic actuator 110 may include a first end and a second end. The first end of the hydraulic actuator 110 may be coupled to the guide tube 102. For example, the leg assembly 100 may include a leg shackle 118 and a pin 120. The leg shackle 118 may be coupled to the upper flange 112 of the guide tube 102. The pin 120 may be inserted through the leg shackle 118 and the first end of the hydraulic actuator 110. The pin 120 may then be secured (e.g., by one or more cotter pins). Thus, the first end of the hydraulic actuator 110 may be coupled to the guide tube 102 by the upper flange 112, the leg shackle 118 and the pin 120. Similarly, the second end of the hydraulic actuator 110 may be coupled to the tube weldment 104. For example, the tube weldment 104 may include one or more holes 122 by which a pin 124 may be inserted. The pin 124 may secure the second end of the hydraulic actuator 110, such that the hydraulic actuator 110 may be coupled to the tube weldment 104. The pin 120 may then be secured (e.g., by one or more cotter pins). The leg assembly 100 may then be configured to actuate for linearly translating the tube weldment relative to the guide tube. By linearly translating the tube weldment relative to the guide tube, the leg assembly 100 may adjust a height of a construction machine to which the leg assembly 100 is coupled. Furthermore, the hydraulic actuator 110 may be coupled within both the guide tube 102 and the tube weldment 104. By the coupling within the guide tube 102 and the tube weldment 104, a stroke of the hydraulic actuator 110 may be increased. The tube weldment 104 may be translated within the guide tube 102 for a length corresponding to the stroke of the hydraulic actuator 110.

In embodiments, the leg assembly 100 may include a bearing 130. The bearing 130 may be coupled to a top end of the tube weldment 104. In this regard, the bearing 130 may be translated within the guide tube 102 when the hydraulic actuator 110 linearly translates the tube weldment 104 relative to the guide tube 102. By translating with the tube weldment 104, the bearing 130 may provide an interface between the tube weldment 104 and the guide tube 102. In some embodiments, the bearing 130 may include a nylon wear material, such as, but not limited to, oil impregnated nylon (e.g., Nyloil, Nyloil Food-Grade, or Nyloil Mdx). The bearing 130 may be coupled to the upper end of the tube weldment 104 after the upper end is inserted through the power drive.

In embodiments, the tube weldment 104 may include a yoke 132. The yoke 132 may be disposed at a lower end of the tube weldment 104. The yoke 132 may be coupled to the lower end by any suitable means, such as, but not limited to, a weld or a fastener (e.g., a bolt). By the yoke 132, the tube weldment 104 may be configured to couple with a propulsion device configured to propel the construction machine. For example, the propulsion device may include any suitable propulsion device, such as, but not limited to, a drive wheel or a crawler assembly. In this regard, the yoke 132 may define a u-shaped channel by which the power drive (e.g., the crawler assembly) is received. The u-shaped channel may be formed of a single piece of a material formed into the channel. The u-shaped channel may also be formed from one or more pieces welded together. The yoke 132 may further include one or more attachment means for the power drive, such as, but not limited to, oppositely disposed holes for receiving an attachment rod.

The leg assembly 100 may also include the power drive. A first portion of the power drive may be coupled to the lower flange 114 of the guide tube 102. A second portion of the power drive may be coupled to the steering ring 108. The power drive may be configured to rotate the first portion relative to the second portion, such that the steering ring 108 rotates relative to the guide tube 102. The steering ring 108 may also be configured to engage with the tube weldment 104, such that the rotation of the steering ring 108 causes the tube weldment 104 to rotate relative to the guide tube 102. By rotating the tube weldment 104 relative to the guide tube 102, the power drive may selectively control a steering angle of a crawler assembly. The power drive may include an inner diameter. The tube weldment 104 may be configured to linearly translate through the inner diameter of the power drive by the hydraulic actuator 110. The power drive may include any suitable power drive, such as, but not limited to, a slew drive or a hydraulic steering cylinder assembly. For example, where the power drive includes the slew drive, the slew drive may be configured to rotate the tube weldment 104 relative to the guide tube 102 by up to ninety degrees, or more.

In embodiments, the power drive includes a slew drive 106. The slew drive 106 may include an inner ring 134 and an outer ring 136. The outer ring 136 may be configured to rotate about the inner ring 134. Bearings (e.g., ball bearings) may be disposed between the inner ring 134 and the outer ring 136 in a bearing raceway, to provide an interface between the inner ring 134 and the outer ring 136. The slew drive 106 may further include one or more hydraulic motors 126. For example, the slew drive 106 may include a single hydraulic motor or a double hydraulic motor. The hydraulic motor 126 may receive hydraulic pressure from the construction machine. A worm gear may be mounted to a shaft of the hydraulic motor 126. Thus, the hydraulic motor 126 may drive the worm gear. The worm gear may further interface with the outer ring 136 by gear teeth around an outer diameter of the outer ring 136. In this regard, the outer ring 136 may be driven by the hydraulic motor 126 and the worm gear for translating the outer ring 136 relative to the inner ring 134. The inner ring 134 of the slew drive 106 may include an inner diameter. The inner diameter may be greater than a combined width of the portion of the tube weldment 104 which translates within the guide tube 102 (e.g., the cylindrical tube 302 and the keyway 304). In this regard, the portion of the tube weldment 104 may be configured to translate through the inner ring 134. For example, the inner diameter of the inner ring 134 may be ten inches or greater.

In embodiments, the slew drive 106 may be configured to couple with the lower flange 114. For example, each of the lower flange 114 and the outer ring 136 of the slew drive 106 may include a radial arrangement of holes. Where the lower flange 114 and the outer ring 136 share a common radial arrangement, the guide tube 102 and the slew drive 106 may be directly coupled by the lower flange 114 and the outer ring 136. Where the lower flange 114 and the outer ring 136 do not share a common radial arrangement, the leg assembly 100 may further include an adapter 128 by which the guide tube 102 and the slew drive are coupled. For example, the adapter 128 may include a first radial arrangement matching the radial arrangement of the outer ring 136 and a second radial arrangement matching the radial arrangement of the lower flange 114. Similarly, the slew drive 106 may be configured to couple with the steering ring 108. For example, each of the inner ring 134 of the slew drive 106 and the steering ring 108 may include a radial arrangement of holes. Where the inner ring 134 and the steering ring 108 share a common radial arrangement, the slew drive 106 may be directly coupled to the steering ring 108 by the inner ring 134. Where the inner ring 134 and the steering ring 108 do not share a common radial arrangement, the leg assembly 100 may further include an adapter by which the inner ring 134 and the steering ring 108 are coupled (see FIGS. 4A-5, for example).

In embodiments, the slew drive 106 may be selected based upon a desired output torque. In this regard, the desired output torque may be based on a weight of the construction machine which the leg assembly 100 supports. For example, the construction machine may include a four-track slipform paver or a three-track curb- and gutter machine. The four-track slipform pavers may include a paving width between twelve feet and fifty feet, or greater (e.g., between twelve to forty feet, between twelve and thirty feet, between twelve and twenty-four feet, etc.). Such four-track slipform pavers may require a larger output torque than the three-track curb-and-gutter machine. In this regard, it is contemplated that the slew drive 106 may include a diameter from fourteen inches to twenty-one inches, depending upon the desired output torque. Although the construction machine has been described by an application of a four-track slipform paver or a three-track curb-and-gutter this is not intended as a limitation of the present disclosure.

Figure 2:
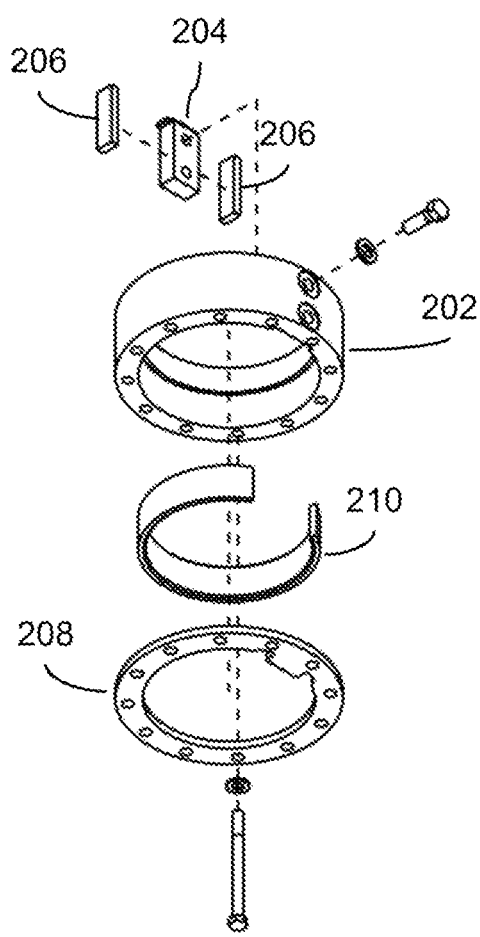
FIG. 2 depicts an exploded view of a steering ring, in accordance with one or more embodiments of the present disclosure.
Figure 3A:
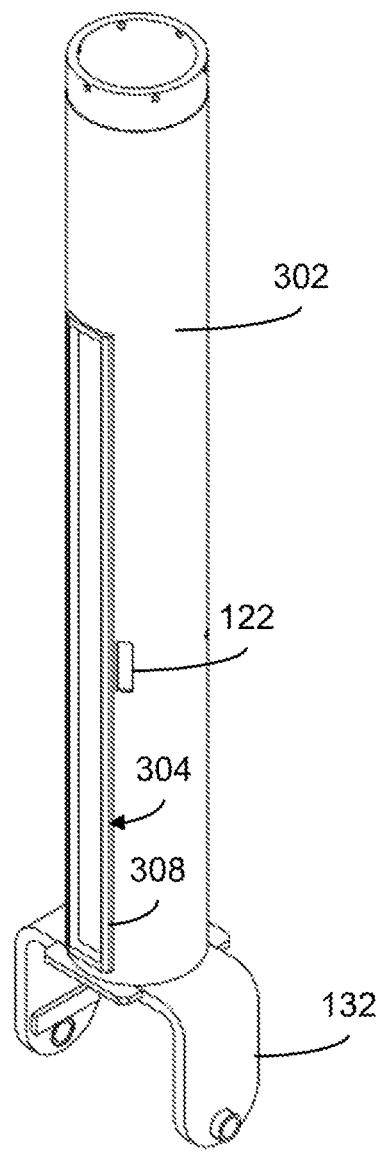
FIG. 3A depicts an isometric view of a tube weldment, in accordance with one or more embodiments of the present disclosure.
Figure 3B:
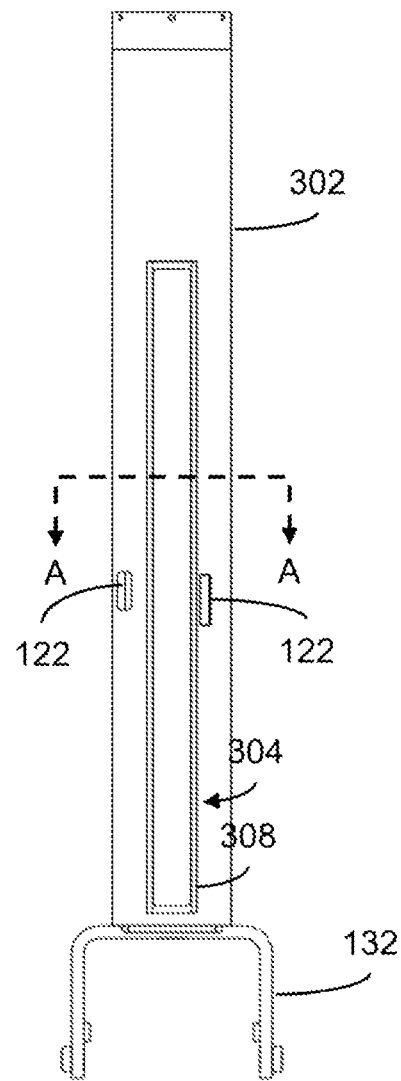
FIG. 3B depicts a rear view of a tube weldment, in accordance with one or more embodiments of the present disclosure.
Figure 3C:
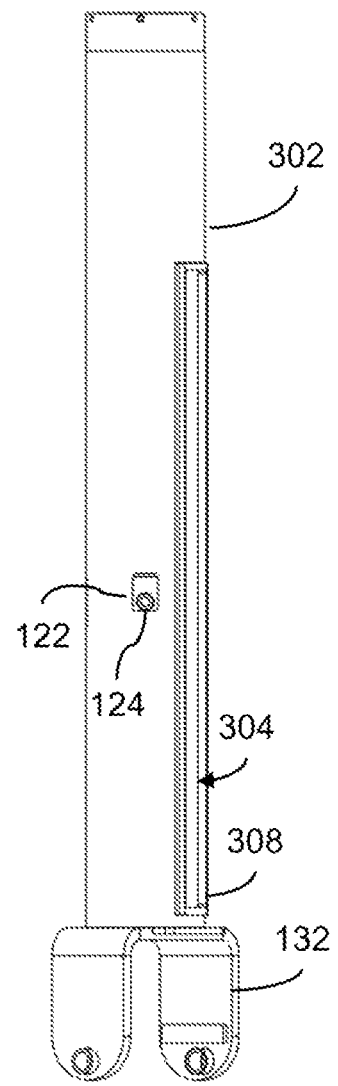
FIG. 3C depicts a left-rear view of a leg assembly, in accordance with one or more embodiments of the present disclosure.
Figure 3D:
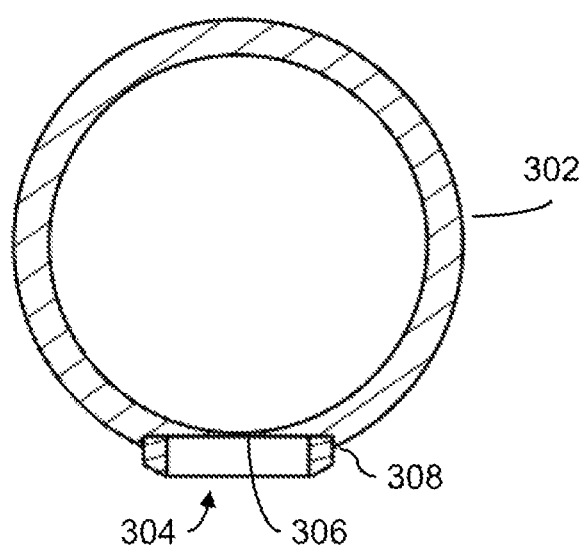
FIG. 3D depicts a section view of the leg assembly of FIG. 3B, in accordance with one or more embodiments of the present disclosure.
Figure 4A:
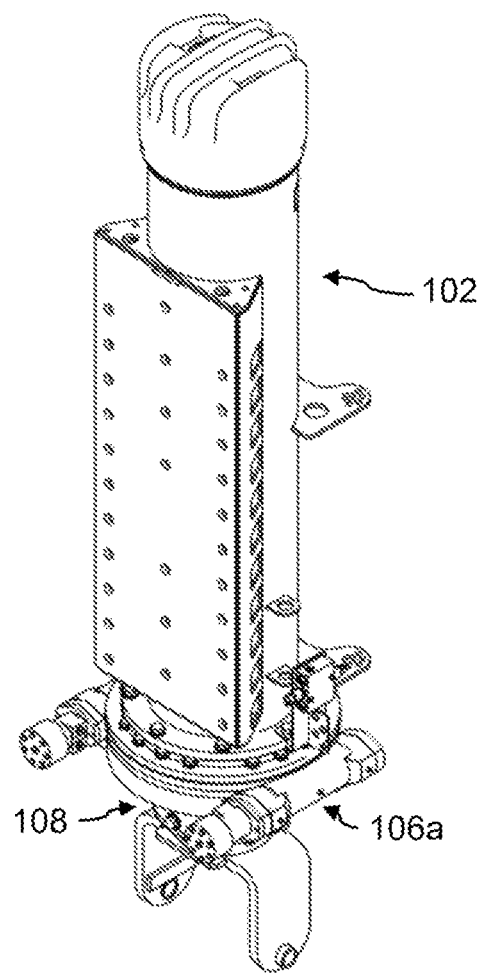
FIG. 4A depicts an isometric view of a leg assembly, in accordance with one or more embodiments of the present disclosure.
Figure 4B:
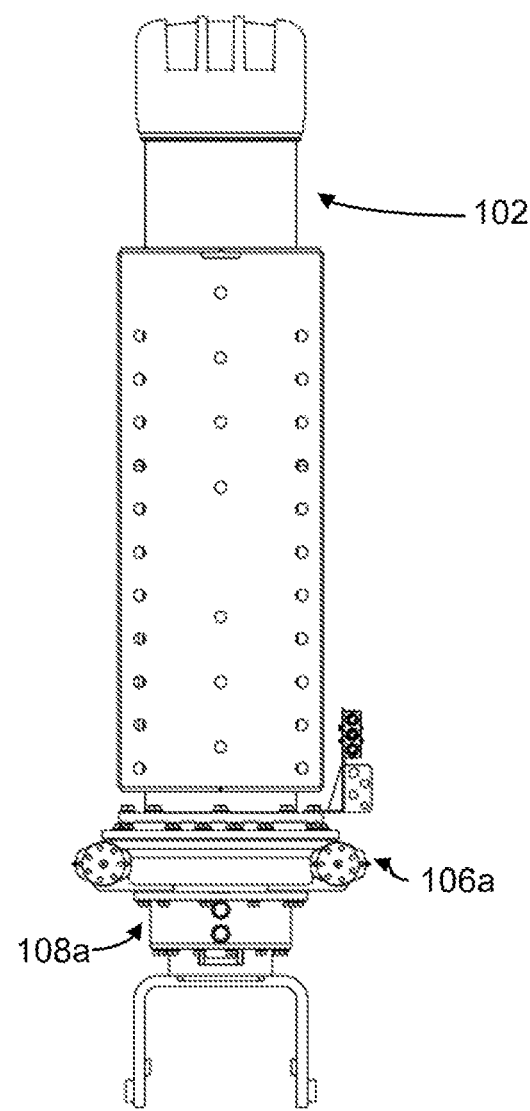
FIG. 4B depicts a rear view of a leg assembly, in accordance with one or more embodiments of the present disclosure.
Figure 4C:
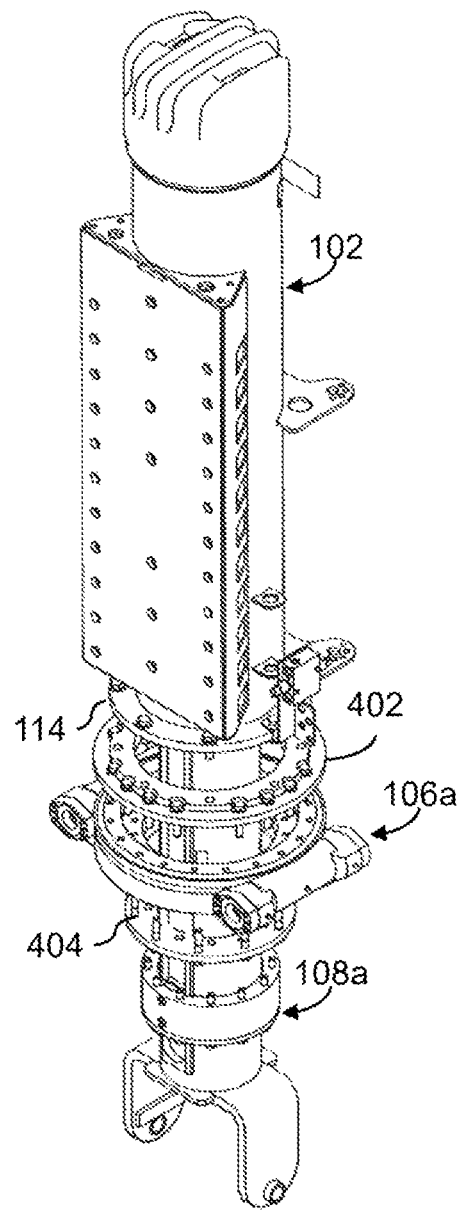
FIG. 4C depicts a partial exploded view of a leg assembly, in accordance with one or more embodiments of the present disclosure.
Figure 4D:
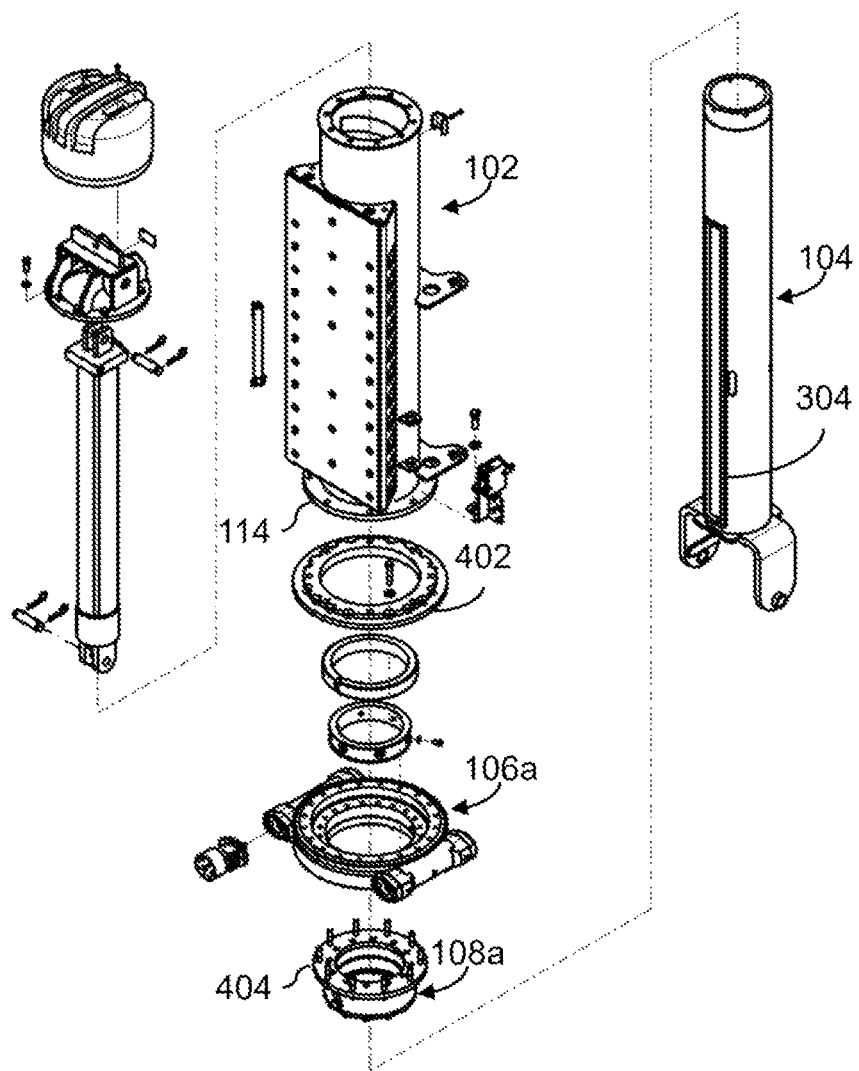
FIG. 4D depicts an exploded view of a leg assembly, in accordance with one or more embodiments of the present disclosure.

Referring now to FIG. 2, the steering ring 108 is further described, in accordance with one or more embodiments of the present disclosure. The steering ring 108 may include one or more of a collar 202, a key 204, one or more wear pads 206, a retainer 208, or a split bushing 210. The collar 202 may be defined by a hollow cylindrical shape including an inside radius and an outside radius (e.g., a cylindrical collar). The inside radius of the collar 202 may be larger than a cylindrical portion of the tube weldment 104. In this regard, the collar 202 may be configured to translate around the cylindrical portion of the tube weldment 104. The cylindrical collar 202 may also include a key-recess inset along a length of the collar 202. The key-recess may define a longitudinal channel which has been cut from the inside radius of the collar 202 (e.g., by a key-seating process). For example, the key-recess may include a rectangular cross-section to which the key 204 may be coupled.

In embodiments, the steering ring 108 includes a key 204 coupled to the key-seat of the collar 202. The key 204 may include a rectangular shaped key stock suitable for being received within the key-seat of the collar 202. The key 204 may be coupled to the key-seat of the collar 202 by one or more fasteners (e.g., bolts). For example, the key 204 may be coupled with the collar 202 by the fasteners after the collar 202 has been slid over the tube weldment 104. The key 204 may include first and second faces. The first and second faces may be oppositely opposed on the key 204. The first and second faces may extend beyond the key-seat when the key 204 is coupled with the collar 202. By the first and second faces, the key 204 may translate rotational movements of the cylindrical collar 202 to a keyway 304. In embodiments, a length of the key 204 may be substantially less than the keyway 304. For example, the key 204 may have a length less than or equal to a length of the collar 202 and the keyway 304 may include a length greater than a stroke of the hydraulic actuator 110. In this regard, the key 204 may include a length of between three and seven inches (e.g., four inches) and the keyway 304 may include a length between forty-two and sixty inches. Thus, a ratio of the key 204 to the keyway 304 may be at least one to six. As may be understood the lengths provided herein are exemplary. However, providing a greater length of the keyway 304 may extend a range of the stroke of the hydraulic cylinder. By way of another example, the key 204 may have a length less than or equal to a length of the key-seat of the collar 202, where the key-seat extends for less than a full length of the collar 202. As the hydraulic actuator 110 is actuated to linearly translate the tube weldment 104 relative to the guide tube 102, the key 204 may be translated along the keyway 304 (e.g., by the coupling between the steering ring 108 and the guide tube 102). To reduce a wear between the key 204 and the keyway 304, the steering ring 108 may further include one or more wear pads 206.

The wear pads 206 may interface between the key 204 and the keyway 304. As the tube weldment 104 is translated relative to the guide tube 102, the wear pads 206 may be maintained fixed relative to the key 204 for providing the interface. For example, the steering ring 108 may include two wear pads 206, with each wear pad 206 interfacing between the key 204 and the keyway 304. The wear pads 206 may be considered a sacrificial part which is engineered to fail due to wear between the key 204 and the keyway 304. In this regard, the wear pads 206 may include a material which is softer than the key 204 and the keyway 304. For example, the wear pads 206 may include a polyester textile Polytetrafluoroethylene (PTFE) lubrication polyester resin with a material lubricant (i.e., a CIP 131A material). The wear pads 206 may include a thickness, such as, but not limited to, a thickness of one-half inch, with such thickness being reduced as the wear pads experience wear. By the wear pads 206, the key 204 and the keyway 304 may include an improved life-time before repair or replacement.

In embodiments, the wear pads 206 may be retained adjacent to the key 204. In this regard, the key 204 may include an upper portion (e.g., a lip) which is configured to prevent a first axial travel of the wear pads 206. Similarly, a retainer 208 may be configured to prevent a second axial travel of the wear pads. In this regard, the steering ring 108 may include a retainer 208 detachably attached to the collar 202. The retainer 208 may be configured to detachably attach to a bottom surface of the collar 202. The retainer 208 may be configured to retain the wear pads 206 when the retainer 208 is attached to the collar 202. Thus, the wear pads 206 may be retained between the key 204 and the retainer 208, when the tube weldment 104 is linearly translated relative to the steering ring 108. In embodiments, the wear pads 206 may also be removed from the steering ring 108 for ease-of-replacement. The retainer 208 may be detached from the collar 202. When the retainer 208 is detached, the wear pads 206 may be removed and replaced. Optionally, the key 204 may also be replaced. However, by the wear pads 206, the key 204 may have a substantially longer life.

The steering ring 108 may also include a split bushing 210. The split bushing 210 may be disposed within the inner radius of the collar 202. The split bushing 210 may provide an interface between the inner surface of the collar 202 and an outer surface of the tube weldment 104. In some embodiments, the split bushing 210 may include a nylon wear material, such as, but not limited to, oil impregnated nylon (e.g., Nyloil, Nyloil Food-Grade, or Nyloil Mdx). The split bushing 210 may also include an opening (i.e., a split) which surrounds the keyway 304. In this regard, the keyway 304 may prevent the split bushing 210 from interfering with the key 204. The split bushing 210 may be retained within the collar 202 by the retainer 208. The retainer 208 may include an inner diameter which is smaller than the inner diameter of the collar 202. For example, the collar 202 may be slid over the tube weldment 104, the split bushing 210 may be inserted between the collar 202 and the tube weldment 104, and then the retainer 208 may be attached to the lower surface of the collar 202. The split bushing 210 may also be retained by the collar 202. For example, the collar 202 may include a lip portion with an inner diameter smaller than the diameter of the split bushing. Alternatively, the split bushing 210 may be retained by an additional retainer coupled to the opposing side of the retainer 208. Although the retainer 208 is depicted as being formed from a piece of plate, this is not intended as a limitation on the present disclosure. In some embodiments, the retainer 208 may include two or more portions which may be separately attached and detached from the collar 202. Where the retainer 208 includes two or more portions, the retainer 208 may further be attached or detached from the leg assembly 100 when the tube weldment 104 is housed within the guide tube 102 without the retainer 208 interfering with the yoke 132.

Referring now to FIGS. 3A-3D, the tube weldment 104 is further described, in accordance with one or more embodiments of the present disclosure. The tube weldment 104 may include a cylindrical tube 302. The cylindrical tube 302 may include an outer surface defining an outside diameter of the cylindrical tube 302 and an inner surface defining an inside diameter of the cylindrical tube 302. The cylindrical tube 302 may be configured to couple with the hydraulic actuator 110 within the cylindrical tube 302. In this regard, the inside diameter of the cylindrical tube 302 may be larger than a width of the hydraulic actuator 110. For example, the inside diameter of the cylindrical tube 302 may be at least five inches for receiving the hydraulic actuator 110 within the cylindrical tube 302. Similarly, the outside diameter of the cylindrical tube 302 may be smaller than the inside diameter of one or more of the guide tube 102, the power drive (e.g., the inner ring of the slew drive 106), or the collar 202. Although the tube weldment 104 is described as including a cylindrical tube, this is not intended as a limitation on the present disclosure. In this regard, the tube weldment 104 may include a square tube. However, the cylindrical tube 302 may be advantageous for an increased space within the tube weldment 104 for the hydraulic actuator 110 and similarly for allowing for a reduced inner diameter of a power drive. The cylindrical tube 302 may also include the one or more holes 122 by which the pin 124 may be inserted, for coupling with the hydraulic actuator 110 within the cylindrical tube 302. The cylindrical tube 302 may also include a first end (i.e., an upper end) to which the bearing 130 may be coupled. The cylindrical tube 302 may also include a second end (i.e., a lower end) to which the yoke 132 may be coupled (e.g., by a weld or a fastener means).

In embodiments, the tube weldment 104 may include the keyway 304 disposed along a length of the tube weldment 104. For example, the cylindrical tube 302 may include the keyway 304. A length of the keyway 304 may be greater than a stroke of the hydraulic actuator 110. In this regard, the hydraulic actuator 110 may be engaged for the full stroke without the upper end or the lower end of the keyway 304 interfering with a travel of the key 204. For example, the length of the keyway 304 may be at least fifty inches. Although the length of the keyway 304 is described as being greater than the stroke of the hydraulic actuator 110, this is not intended as a limitation on the present disclosure. The keyway 304 may include a rectangular cross-section by which relative rotational movements may be translated from the key 204. For example, the keyway 304 may include a width of around three inches.

In embodiments, the keyway 304 may be formed by a slot 306 inset into the outer surface along a length of the cylindrical tube 302. For example, the slot 306 may be formed into the outer surface of the cylindrical tube 302 by a milling process. The keyway 304 may be further formed by a plate 308. The plate 308 may include a rectangular bar stock, including any suitable material, such as, but not limited to a low-carbon steel (e.g., a cold-finished 1018 steel). The plate 308 may also include a recess formed along a substantial length of the plate 308. The recess may be formed by a milling process. The plate 308 may be coupled to the slot 306 by a welding process. The recess of the plate 308 may then define the keyway 304. For example, the recess may include a rectangular recess such that recess the keyway 304 includes a rectangular cross-section. In this regard, the first and second surfaces of the key 204 may engage with the plate 308. The plate 308 may further include one or more beveled edges (e.g., a chamfer or a fillet), such that the cylindrical tube 302 and the keyway 304 may fit through a smaller diameter power drive. For example, a combined width of the outside diameter of the cylindrical tube 302 and the plate 308 may be less than ten inches. The cylindrical tube 302 and the plate 308 may thus be configured to fit through an inside diameter of a cylindrical collar coupled to a fourteen-inch slew drive. Although the keyway 304 is described as being defined by a recess of the plate 308, this is not intended as a limitation of the present disclosure. In this regard, bar stock may be welded to each side of the slot. However, by being formed of the plate 308, the keyway 304 may be able to withstand greater rotational forces.

Referring now to FIG. 4A-4D, a leg assembly 100a is described, in accordance with one or more embodiments of the present disclosure. The leg assembly 100a may be similar to the leg assembly 100, with the exception that the leg assembly 100a includes a slew drive 106a.

Figure 5:
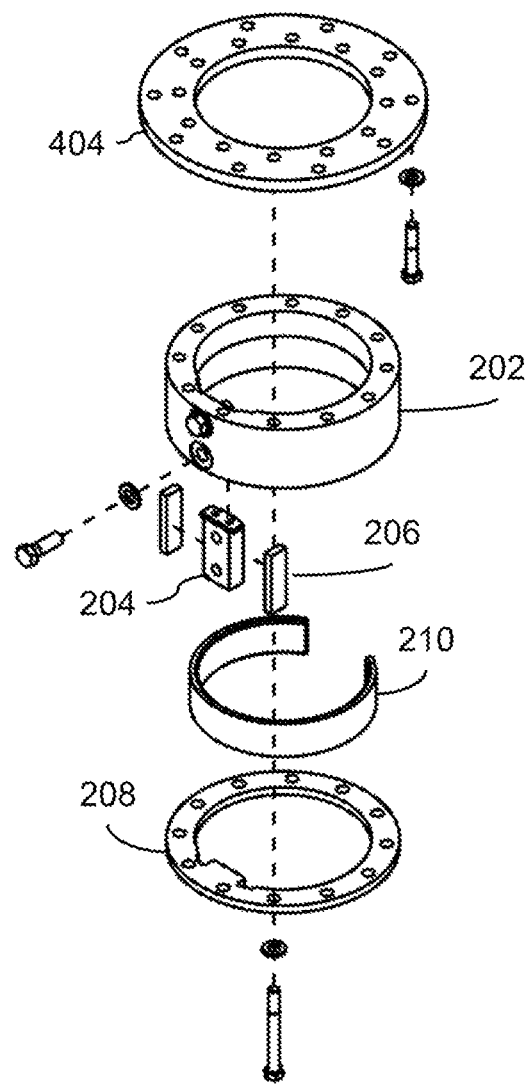
FIG. 5 depicts an exploded view of a steering ring, in accordance with one or more embodiments of the present disclosure.
Figure 6A:
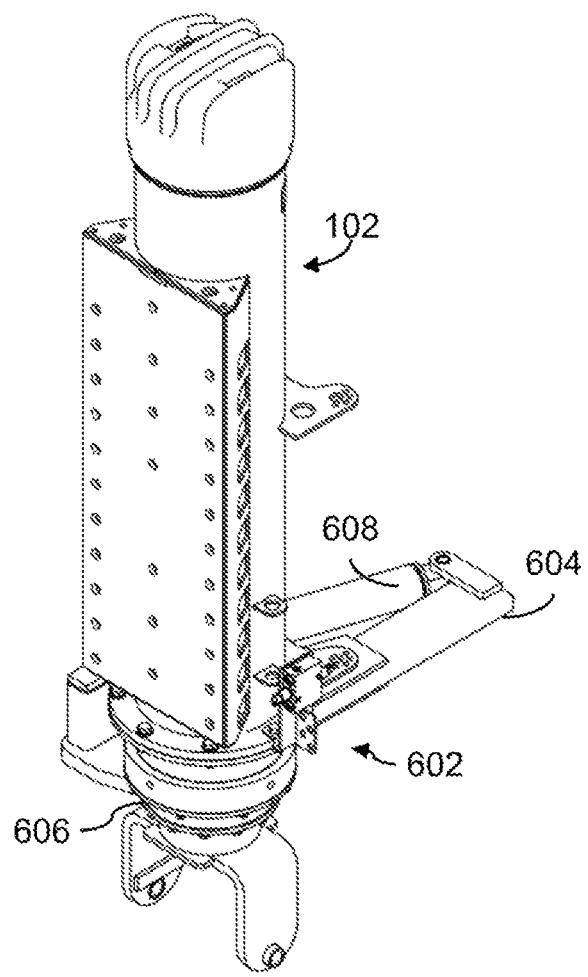
FIG. 6A depicts an isometric view of a leg assembly, in accordance with one or more embodiments of the present disclosure.
Figure 6B:
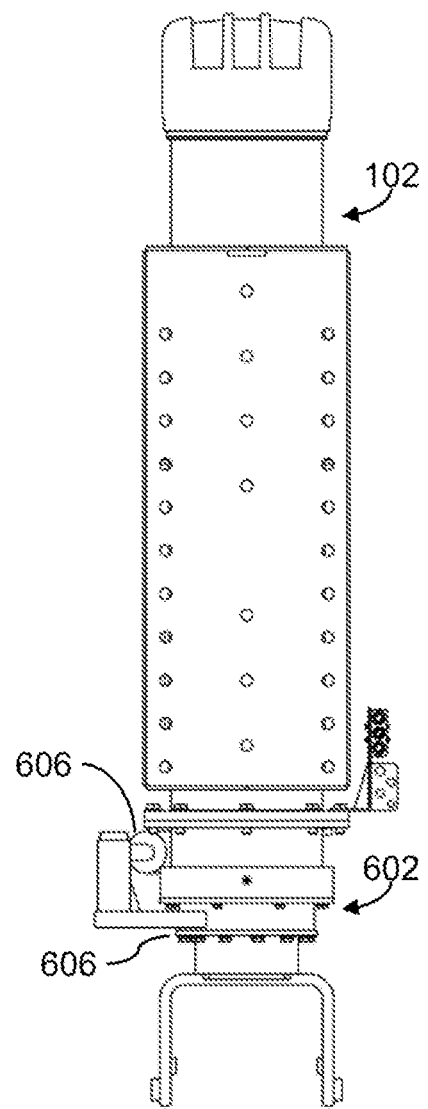
FIG. 6B depicts a rear view of a leg assembly, in accordance with one or more embodiments of the present disclosure.
Figure 6C:
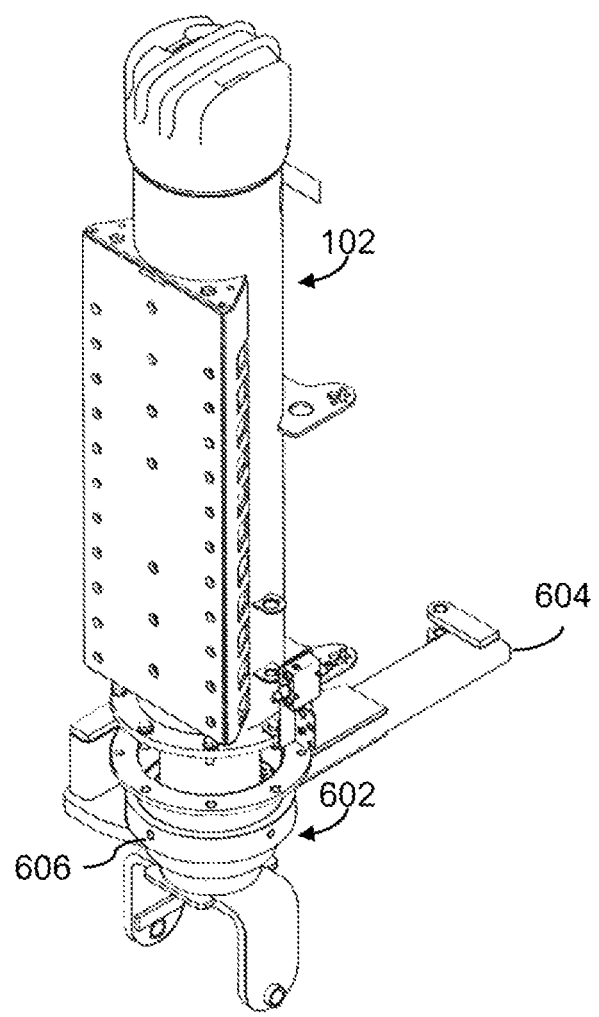
FIG. 6C depicts a partial exploded view of a leg assembly, in accordance with one or more embodiments of the present disclosure.
Figure 6D:
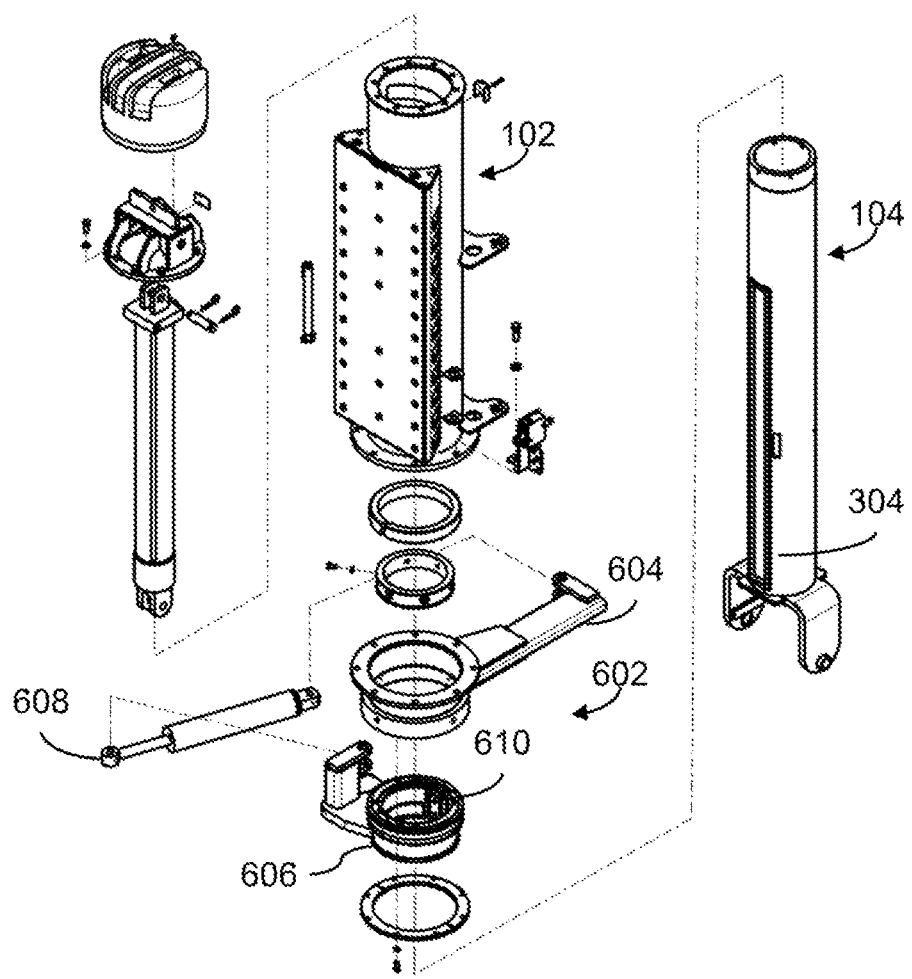
FIG. 6D depicts an exploded view of a leg assembly, in accordance with one or more embodiments of the present disclosure.

As previously discussed, the power drive may be coupled to the lower flange 114 of the guide tube 102. The power drive may include the slew drive 106. The slew drive 106 may be sized based upon a desired output torque. The leg assembly 100a may include a slew drive 106a. The slew drive 106a may include a seventeen-inch slew drive. The leg assembly 100a may also include the guide tube 102, the tube weldment 104, and the steering ring 108. In embodiments, the guide tube 102, the tube weldment 104, and the steering ring 108 may be configurable between various slew drives 106 (e.g., based on the current application). To configure the guide tube 102 for the slew drive 106a, the leg assembly 100a may include an adapter 402 adapting the guide tube 102 with the slew drive 106a. The adapter 402 may include a first and a second set of radially arranged bolt holes by which the guide tube 102 and the slew drive 106a may be adapted. Similarly, the leg assembly 400 may include an adapter 404 to adapt the slew drive 106a with the steering ring 108. The adapter 404 may include a first and a second set of radially arranged bolt holes by which the slew drive 106a and the steering ring 108 may be adapted. Advantageously, the guide tube 102, the tube weldment 104, the cylindrical collar 202, and the key 204 may be similar between the different sized slew drives 106 by the adapters 402, 404. Referring now to FIG. 5, an exploded view of a steering ring 108a is described, in accordance with one or more embodiments of the present disclosure. The steering ring 108a may be similar to the steering ring 108, with the exception that the steering ring 108a further includes the adapter 404 coupled to the cylindrical collar 202.

Referring now to FIGS. 6A-6D, a leg assembly 100b is described, in accordance with one or more embodiments of the present disclosure. The leg assembly 100b may be similar to the leg assembly 100, with the exception that the leg assembly 100b includes a hydraulic steering cylinder assembly 602. As previously discussed, the leg assembly 100 may include a power drive coupled to the lower flange 114. In embodiments, the power drive includes the hydraulic steering cylinder assembly 602. The hydraulic steering cylinder assembly 602 may include a steering arm 604, a steering ring 606, and a hydraulic actuator 608. The steering arm 604 may be coupled to the guide tube 102 by the lower flange 114. The hydraulic actuator 608 may be coupled between the steering arm 604 and the steering ring 606, for translating relative rotational movements between the steering arm 604 and the steering ring 606. The steering ring 606 may include a key 610 disposed along a length of an inner portion of the steering ring 606. The key 610 may be configured to engage with the keyway 304. Thus, the tube weldment 104 may be configured to accommodate a variety of power drives and steering ring configurations.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "front," "back," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A paving machine, comprising:
   a frame including a slip-form for moving in a first direction of travel for forming a material into shape;
   a leg assembly supporting at least a portion of the frame, the leg assembly comprising:
   a guide tube including a lower flange;
   a slew drive coupled to the lower flange of the guide tube;
   a steering ring coupled to the slew drive, the steering ring including a cylindrical collar, a key, a wear pad, and a retainer, wherein the cylindrical collar includes a key-seat to which the key is coupled, wherein the retainer is detachably attached to the cylindrical collar, wherein the retainer is configured to retain the wear pad when the retainer is attached to the cylindrical collar;
   a tube weldment including a keyway receiving the key, wherein the slew drive is configured to rotate the tube weldment at least ninety degrees relative to the guide tube by rotating the steering ring which translates such rotation to the tube weldment by the key and the keyway, wherein the wear pad is configured to interface between the key and the keyway; and
   a hydraulic actuator including a first end and a second end, the first end of the hydraulic actuator coupled to the guide tube, the second end of the hydraulic actuator coupled to the tube weldment, wherein the hydraulic actuator is configured to actuate to linearly translate the tube weldment relative to the guide tube, wherein the key and the wear pad are configured to travel along the keyway of the tube weldment when the tube weldment linearly translates relative to the guide tube, wherein the keyway is configured to translate through an inner diameter of the slew drive when the tube weldment linearly translates relative to the guide tube;
a crawler assembly coupled to the tube weldment, the crawler assembly including a track drive for propelling the frame in the first direction;
a pivot arm pivotably connecting the leg assembly to the frame; and
a power supply connected to at least the track drive, the hydraulic actuator, and the slew drive for supplying power to the track drive, the hydraulic actuator, and the slew drive.

2. The paving machine of claim 1, wherein a length of the keyway is greater than a stroke of the hydraulic actuator, wherein a length of the key is substantially less than the length of the keyway such that a ratio of the length of the key to the length of the keyway is at least one to six.

3. The paving machine of claim 1, wherein the slew drive includes at least one hydraulic motor, at least one worm gear driven by the at least one hydraulic motor, an outer ring driven by the at least one worm gear, and an inner ring.

4. The paving machine of claim 3, wherein the slew drive is coupled to the lower flange of the guide tube by an adapter coupling the lower flange of the guide tube with the outer ring.

5. The paving machine of claim 4, wherein the steering ring is coupled to the slew drive by a coupling between the cylindrical collar of the steering ring and the inner ring.

6. The paving machine of claim 5, wherein the outer ring includes a diameter between fourteen inches and twenty-one inches.

7. The paving machine of claim 6, further comprising an additional adapter coupling the cylindrical collar and the inner ring.

8. The paving machine of claim 1, further comprising a split bushing, wherein the split bushing is configured to interface between an outer surface of the tube weldment and an inner surface of the cylindrical collar.

9. The paving machine of claim 8, wherein the retainer is configured to retain the split bushing when the retainer is attached to the cylindrical collar, wherein the keyway is configured to prevent the split bushing from interfering with the key.

10. The paving machine of claim 9, wherein the retainer comprises an inside diameter smaller than the inside diameter of the cylindrical collar for retaining the split bushing when the retainer is attached to the cylindrical collar.

11. The paving machine of claim 8, wherein the split bushing consists essentially of an oil impregnated nylon material.

12. The paving machine of claim 1, wherein the guide tube comprises a cylindrical shape.

13. The paving machine of claim 12, further comprising a bearing coupled to an upper portion of the tube weldment, wherein the bearing is configured to interface between the tube weldment and an inner surface of the guide tube, wherein the bearing is configured to translate within the guide tube when the tube weldment linearly translates relative to the guide tube.

14. The paving machine of claim 1, wherein the guide tube further includes at least one mounting flange, wherein the guide tube is configured to couple with a construction machine by the at least one mounting flange.

15. The paving machine of claim 1, further comprising a leg shackle and a pin, wherein the guide tube includes an upper flange, wherein the first end of the hydraulic actuator is coupled to the guide tube by the upper flange, the leg shackle, and the pin.

16. The paving machine of claim 1, wherein the key comprises a rectangular key.

17. The paving machine of claim 1, wherein the tube weldment further comprises:
a cylindrical tube including a first surface defining an outside diameter of the cylindrical tube and a second surface defining an inside diameter of the cylindrical tube, the cylindrical tube including a slot inset into the first surface along a first length, wherein the cylindrical tube is configured to couple with the hydraulic actuator inside of the cylindrical tube;
a plate coupled to the slot by a weld, the plate defining the keyway; and
a yoke coupled to a bottom portion of the cylindrical tube, wherein the yoke defines a u-shaped channel by which the yoke is configured to couple with the crawler assembly.

18. The paving machine of claim 17, wherein the plate includes a recess defining the keyway.

19. The paving machine of claim 18, wherein the recess includes a rectangular cross section, wherein the keyway is a rectangular keyway.

20. The paving machine of claim 17, wherein a combined width of the outside diameter of the cylindrical tube and the plate is less than ten inches.

21. The paving machine of claim 20, wherein the plate includes a beveled edge for reducing the combined width of the outside diameter of the cylindrical tube and the plate.

22. The paving machine of claim 21, wherein the inside diameter of the cylindrical tube is at least five inches for receiving the hydraulic actuator within the cylindrical tube.

23. The paving machine of claim 17, wherein the cylindrical tube includes a first opening and a second opening by which a pin is inserted for coupling the cylindrical tube with the hydraulic actuator inside of the cylindrical tube.

24. A leg assembly, comprising:
a guide tube including an upper flange and a lower flange;
a slew drive including an outer ring and an inner ring, the slew drive coupled to the lower flange of the guide tube by the outer ring;
a steering ring coupled to the inner ring of the slew drive, the steering ring comprising:
a cylindrical collar including a first surface defining an outside diameter and a second surface defining an inside diameter, the cylindrical collar further including a key-seat inset into the second surface;
a rectangular key coupled to the key-seat, the rectangular key including a first face and a second face opposite of the first face, wherein the first face of the rectangular key and the second face of the rectangular key extend beyond the key-seat;
a first wear pad; and
a retainer detachably attached to the cylindrical collar for retaining the first wear pad;
a tube weldment comprising:
a cylindrical tube including a first surface defining an outside diameter and a second surface defining an inside diameter, the cylindrical tube including a slot inset into the first surface along a first length; and
a plate coupled to the slot by a weld, the plate defining a rectangular keyway, wherein the slew drive is configured to rotate the tube weldment relative to the guide tube by rotating the steering ring which translates such rotation to the tube weldment by the rectangular key and the rectangular keyway, wherein the first wear pad is configured to interface between the first face of the rectangular key and the rectangular keyway; and a hydraulic actuator including a first end and a second end, the first end of the hydraulic actuator coupled to the upper flange of the guide tube, the second end of the hydraulic actuator coupled to the cylindrical tube, wherein the hydraulic actuator is configured to actuate to linearly translate the tube weldment relative to the guide tube, wherein the rectangular key and the first wear pad are configured to travel along the rectangular keyway when the tube weldment linearly translates relative to the guide tube, wherein the keyway is configured to translate through an inner diameter of the slew drive when the tube weldment linearly translates relative to the guide tube.

25. The leg assembly of claim 24, wherein the slew drive is configured to rotate the tube weldment at least ninety degrees relative to the guide tube.

\* \* \* \* \*